United States Patent
Hayasaka (10) Patent No.: US 6,943,513 B2
(45) Date of Patent: Sep. 13, 2005

(54) FORCE-APPLYING INPUT DEVICE

(75) Inventor: Satoshi Hayasaka, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 10/807,671

(22) Filed: Mar. 24, 2004

(65) Prior Publication Data

US 2004/0189227 A1 Sep. 30, 2004

(30) Foreign Application Priority Data

Mar. 28, 2003 (JP) ........................................ 2003-091422

(51) Int. Cl.[7] .............................. H02P 7/00; H02P 5/28
(52) U.S. Cl. ...................... 318/432; 318/433; 318/799
(58) Field of Search ............................. 318/432, 433, 318/616, 651, 799, 832, 271, 437, 461, 456–458; 345/161; 463/38

(56) References Cited

U.S. PATENT DOCUMENTS

| | | | | |
|---|---|---|---|---|
| 6,653,804 | B1 | * 11/2003 | Kureck | 318/3 |
| 6,838,851 | B2 | * 1/2005 | Hayasaka | 318/561 |
| 6,859,003 | B2 | * 2/2005 | Hayasaka | 318/281 |
| 2004/0164700 | A1 | * 8/2004 | Hayasaka | 318/652 |
| 2004/0167642 | A1 | * 8/2004 | Matsumoto et al. | 700/85 |
| 2004/0195987 | A1 | * 10/2004 | Hayasaka | 318/432 |
| 2004/0201605 | A1 | * 10/2004 | Matsumoto et al. | 345/701 |

FOREIGN PATENT DOCUMENTS

JP 2002-149324 5/2002

* cited by examiner

Primary Examiner—Marlon T. Fletcher
Assistant Examiner—Patrick Miller
(74) Attorney, Agent, or Firm—Brinks Hofer Gilson & Lione

(57) ABSTRACT

A force-applying input device includes a controller including a first rotational angular speed calculating unit for calculating rotational angular speed information of an operation unit by signal pulse output from an encoder, a rotational angular acceleration calculating unit for calculating rotational angular acceleration information of the operation unit by torque information output from a torque calculating unit, a second rotational angular speed calculating unit for calculating rotational angular speed information of the operation unit by the information output from the rotational angular acceleration calculating unit, and a rotational angular speed selecting unit for selecting the information output from the first rotational angular speed calculating unit or that output from the second rotational angular speed calculating unit, the latter being selected when the information output from the first rotational angular speed calculating unit exceeds a predetermined value, and outputted to the torque calculating unit and a rotational angle calculating unit.

3 Claims, 6 Drawing Sheets

FORCE-APPLYING INPUT DEVICE

This application claims the benefit of priority to Japanese Patent Application No. 2003-091422, herein incorporated by reference.

BACKGROUND OF THE INVENTION

1. Field of the Invention

The present invention relates to a force-applying input device for applying a force corresponding to a state of operation of an operation unit to the operation unit, and, more particularly, to means for preventing a torque generating unit for applying the force to the operation unit from getting out of control.

2. Description of the Related Art

A force-applying input device which is described below is conventionally known as an input device which is applied to, for example, a vehicle-installed electrical device centralized control system, a steering apparatus, a gearshift apparatus, or a brake system. The force-applying input device comprises an operation unit operated by an operator, a position detecting unit for detecting an operation state of the operation unit, a torque generating unit for applying a force to the operation unit, and a controller for controlling a driving operation of the torque generating unit in order to apply the force corresponding to the operation state of the operation unit to the operation unit. Such a force-applying input device is disclosed in, for example, Japanese Unexamined Patent Application Publication No. 2002-149324 (FIG. 3).

In the force-applying input device, by driving the torque generating unit, various types of forces corresponding to, for example, the operation direction or operation amount of the operation unit can be applied to the operation unit. Therefore, in various types of apparatuses, the operation of the operation unit provides a predetermined operational feel.

In such a force-applying input device, in order to prevent the torque generating unit from getting out of control, that is, to prevent continued movement of the operation unit within its movement range due to vibration of the torque generating unit occurring when the operator takes his/her hand off the operation unit, the following controlling method is used. This method is not a method in which only torque information corresponding to position information output from the position detecting unit is output to the torque generating unit. It is a method in which a combination of the torque information corresponding to the position information and torque information corresponding to the speed of operation of the operation unit calculated from the rate of change of a position signal is output to the torque generating unit. Since, by the torque information corresponding to the speed of operation of the operation unit, the operation of the operation unit provides resistance similar to viscous friction, this torque information is sometimes called viscous friction torque information.

Figure 5:
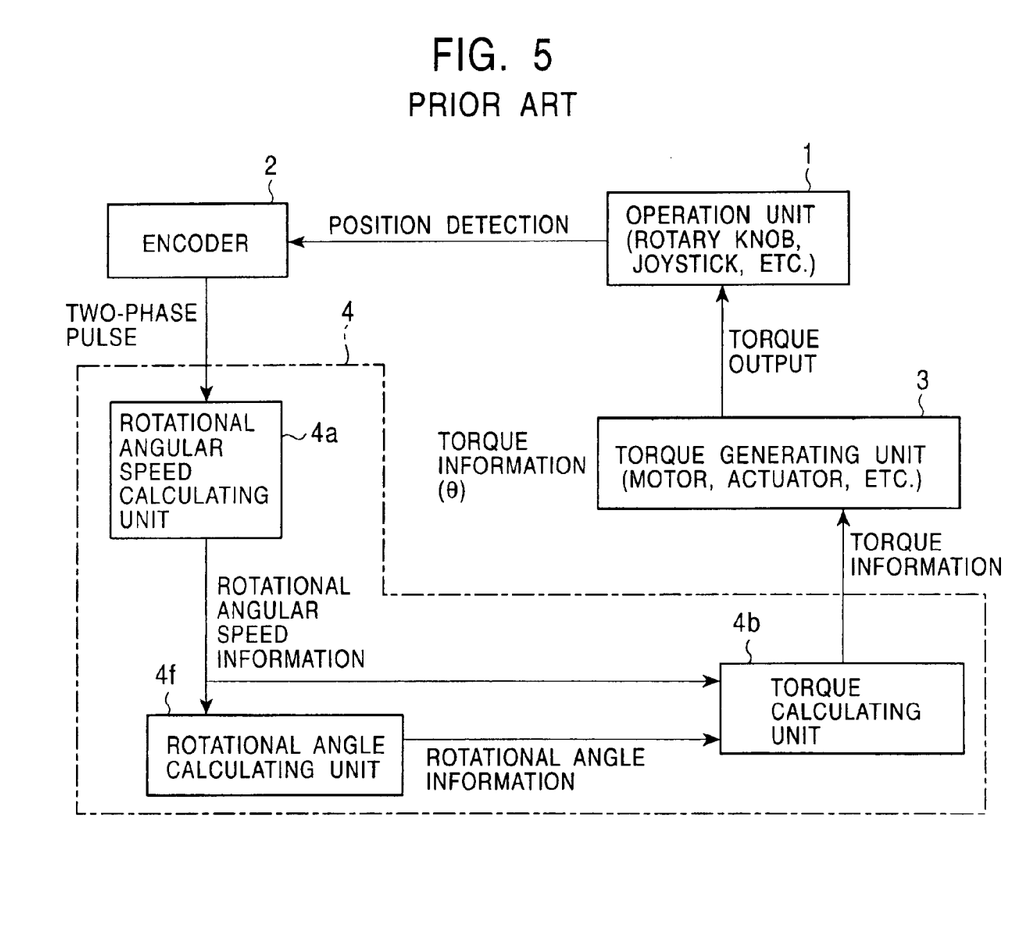
FIG. 5 illustrates the structure of a prior art force-applying input device.

FIG. 5 shows the structure of this type of force-applying input device proposed by the applicant. The force-applying input device mainly comprises an operation unit 1 operated by an operator, an encoder 2 for detecting an operation state of the operation unit 1, a torque generating unit 3 for applying a force to the operation unit 1, and a controller 4 for controlling a driving operation of the torque generating unit 3 in order to apply a predetermined force corresponding to the operation state of the operation unit 1 to the operation unit 1.

The controller 4 comprises a rotational angular speed calculating unit 4a for calculating rotational angular speed information of the operation unit 1 by a signal pulse output from the encoder 2, a torque calculating unit 4b for calculating torque information supplied to the torque generating unit 3, and a rotational angle calculating unit 4f for calculating rotational angle information of the operation unit 1 by the rotational angular speed information output from the rotational angular speed calculating unit 4a. The rotational angular speed calculating unit 4a outputs the calculated rotational angular speed information to the torque calculating unit 4b and the rotational angle calculating unit 4f. The torque calculating unit 4b calculates the torque information based on the rotational angular speed information output from the rotational angular speed calculating unit 4a and the rotational angle information output from the rotational angle calculating unit 4f, and outputs the torque information to the torque generating unit 3. A torque component which is calculated based on the rotational angular speed information corresponds to viscous friction torque, and a torque component which is calculated based on the rotational angle information corresponds to the force applied to the operation unit 1 that provides, for example, a tactile feel.

Figure 6:
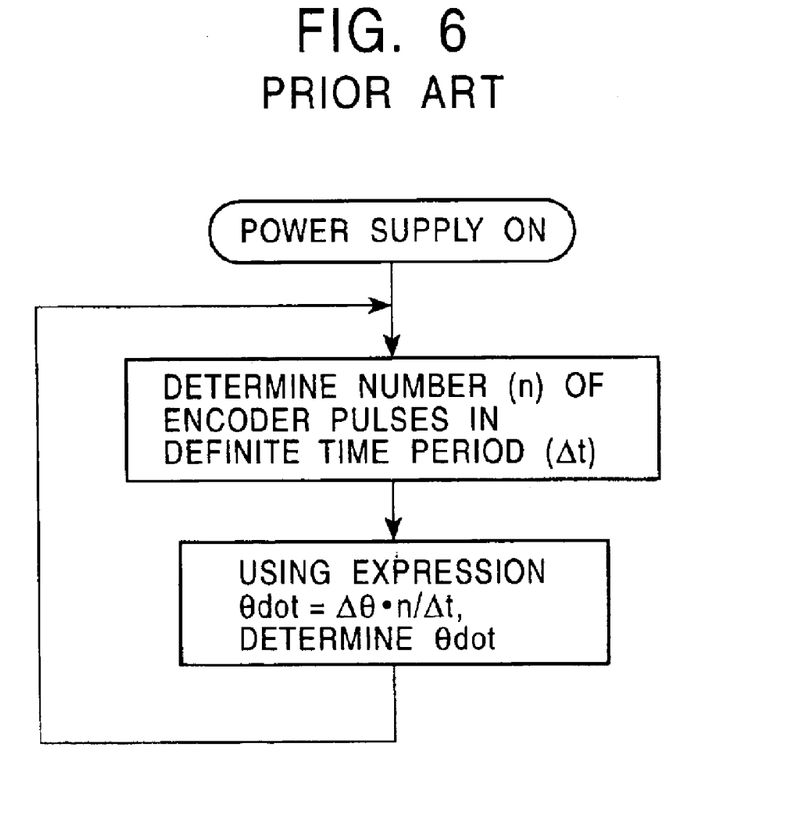
FIG. 6 is a flow chart of the steps of calculating rotational angular speed information in the prior art force-applying input device.

As shown in FIG. 6, the rotational angular speed calculating unit 4a counts a number n of signal pulses per definite period of time $\Delta t$ output from the encoder 2, and calculates rotational angular speed information $\theta$dot of the operation unit 1 using an expression $\theta\text{dot}=\Delta\theta \cdot n/\Delta t$. $\Delta\theta$ in the expression refers to the resolution of the encoder 2.

Accordingly, in the force-applying input device having this structure, the viscous friction torque component based on the rotational angular speed information is added to the torque information supplied to the torque generating unit 3. Therefore, as long as signal pulses output from the encoder 2 can be precisely counted, it is possible to prevent the torque generating unit 3 from getting out of control.

The force-applying input device having the above-described structure is constructed based on the assumption that the rotational angular speed calculating unit 4a can always precisely count the signal pulses output from the encoder 2. However, actually, when the number n of signal pulses per definite period of time $\Delta t$ is increased due to a high operation speed of the operation unit 1, the signal pulses are miscounted more frequently. Therefore, rotational angular speed information corresponding to the actual rotational angular speed of the operation unit 1 can no longer be calculated. Consequently, the operation of the operation unit 1 becomes unstable, and, in the worst case, the torque generating unit 3 gets out of control.

SUMMARY OF THE INVENTION

Accordingly, in order to overcome such problems of the related art, it is an object of the present invention to provide a highly reliable force-applying input device which makes it possible to reliably prevent a torque generating unit from getting out of control and which has excellent operability.

To this end, according to the present invention, there is provided a force-applying input device comprising force-applying input device comprising an operation unit operated by an operator, an encoder for detecting an operation state of the operation unit, a torque generating unit for applying a force to the operation unit, and a controller for controlling a driving operation of the torque generating unit in order to apply a predetermined force corresponding to the operation state of the operation unit to the operation unit. The controller comprises a first rotational angular speed calculating unit, a second rotational angular speed calculating unit, a rotational angular speed selecting unit, a rotational angle calculating unit, and a torque calculating unit. The first rotational angular speed calculating unit calculates rotational angular speed information of the operation unit based on a signal pulse output from the encoder. The second rotational angular speed calculating unit calculates rotational angular speed information of the operation unit based on rotational angular acceleration which the operation unit undergoes. The rotational angular speed selecting unit selects either the rotational angular speed information output from the first rotational angular speed calculating unit or the rotational angular speed information output from the second rotational angular speed calculating unit, the rotational angular speed information output from the second rotational angular speed calculating unit being selected and being output to the rotational angle calculating unit and the torque calculating unit when the rotational angular speed information output from the first rotational angular speed calculating unit is greater than a predetermined value. The rotational angle calculating unit calculates rotational angle information of the operation unit based on the rotational angular speed information output from the rotational angular speed selecting unit. The torque calculating unit calculates information of torque to be applied to the torque generating unit, based on the rotational angular speed information output from the rotational angular speed selecting unit and the rotational angle information output from the rotational angle calculating unit.

As described above, the controller of the force-applying input device comprises a first rotational angular speed calculating unit for calculating rotational angular speed information of the operation unit based on a signal pulse output from the encoder, a second rotational angular speed calculating unit for calculating rotational angular speed information of the operation unit based on rotational angular acceleration which the operation unit undergoes, and a rotational angular speed selecting unit for selecting either the rotational angular speed information output from the first rotational angular speed calculating unit or the rotational angular speed information output from the second rotational angular speed calculating unit. Accordingly, when the rotational angular speed information output from the second rotational angular speed calculating unit is selected when the rotational angular speed information output from the first rotational angular speed calculating unit exceeds a predetermined value, and is output to the rotational angle calculating unit and the torque calculating unit, even if the first rotational angular speed calculating unit does not provide precise rotational angular speed information due to a high operation speed of the operation unit, the precise rotational angular speed information can be calculated by the second rotational angular speed calculating unit. Therefore, by calculating a viscous friction torque component of the torque information based on the rotational angular speed information, and by controlling a driving operation of the torque generating unit by the torque information including the viscous friction torque component, it is possible to reliably prevent the torque generating unit from getting out of control, and, thus, to enhance the operability and reliability of the force-applying input device.

In the force-applying input device, the controller may further comprise a rotational angular acceleration calculating unit for calculating rotational angular acceleration information of the operation unit based on inertial moment of the operation unit and the torque information to be output to the torque generating unit from the torque calculating unit, and the second rotational angular speed calculating unit may calculate the rotational angular speed information of the operation unit based on the rotational angular acceleration information output from the rotational angular acceleration calculating unit.

Accordingly, when the second rotational angular speed calculating unit calculates the rotational angular speed of the operation unit based on the rotational angular acceleration information output from the rotational angular acceleration calculating unit, if the first rotational angular speed calculating unit cannot provide precise rotational angular speed information due to a high operation speed of the operation unit, a viscous friction torque component corresponding to the rotational angular acceleration which the operation unit is subjected to can be applied to the torque generating unit. Therefore, it is possible to reliably prevent the torque generating unit from getting out of control, and, thus, to enhance the operability and reliability of the force-applying input device.

In the force-applying input device, the second rotational angular speed calculating unit may store maximum torque of the torque generating unit and inertial moment of the operation unit, and calculate the rotational angular speed information of the operation unit based on the maximum torque and the inertial moment.

The torque generating unit gets out of control only when the actual operation speed of the operation unit is greater than the operation speed of the operation unit calculated by the controller. Therefore, when the rotational angular speed of the operation unit is calculated based on the maximum torque of the torque generating unit and the inertial moment of the operation unit which are stored in the second rotational angular speed calculating unit, and the rotational angular speed selecting unit selects the rotational angular speed information output from the second rotational angular speed calculating unit, the maximum viscous friction torque component is applied to the torque generating unit. Therefore, it is possible to reliably prevent the torque generating unit from getting out of control. In addition, since it is no longer necessary to calculate the rotational angular acceleration by the rotational angular acceleration calculating unit, it is possible to simplify a controller circuit structure and, thus, to increase the calculation speed.

DESCRIPTION OF THE PREFERRED EMBODIMENTS

Figure 1:
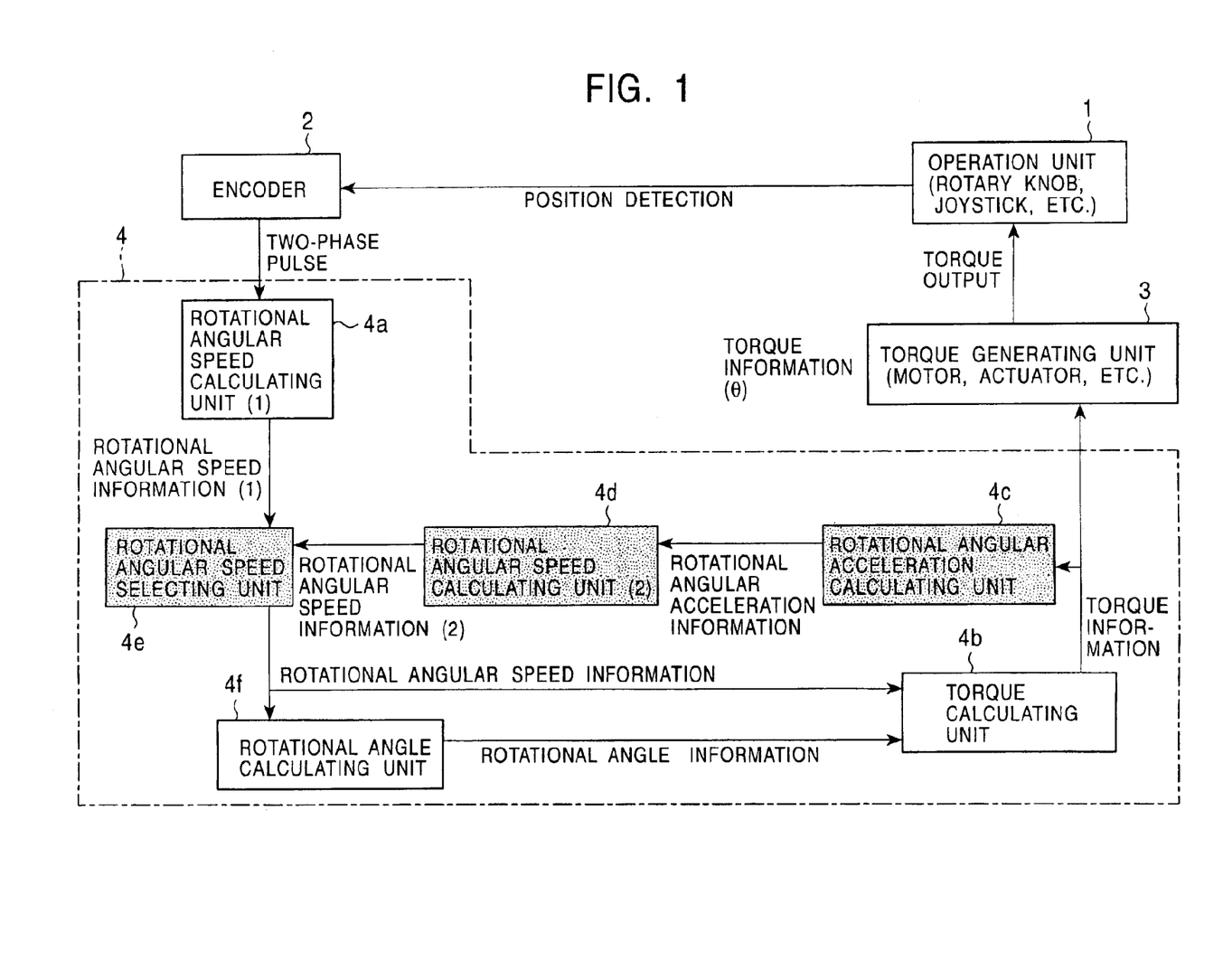
FIG. 1 illustrates the structure of a force-applying input device of a first embodiment of the present invention.
Figure 2:
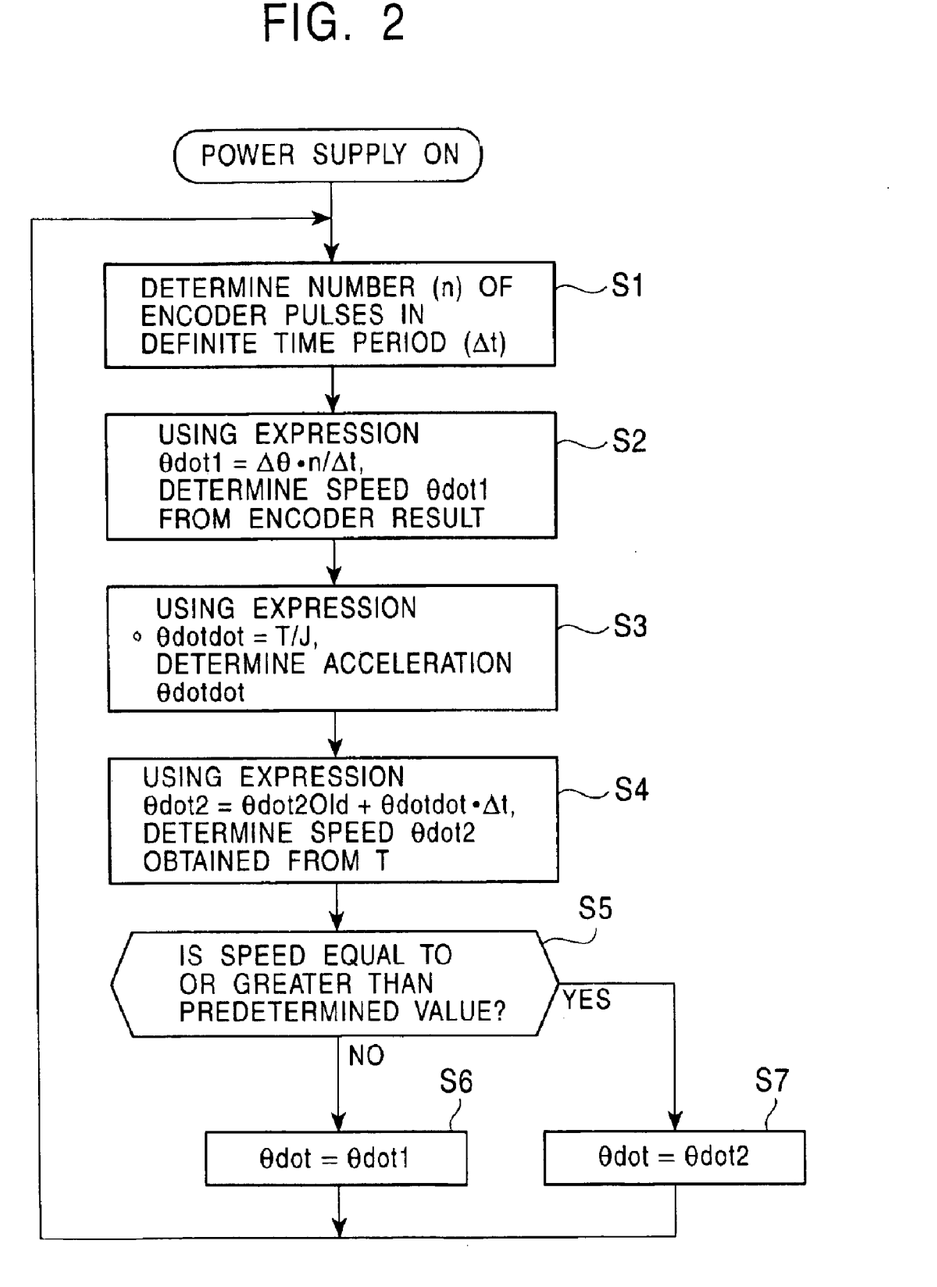
FIG. 2 is a flow chart of the steps of calculating rotational angular speed information in the force-applying input device of the first embodiment of the present invention.

Hereunder, a force-applying input device of a first embodiment of the present invention will be described with reference to FIGS. 1 and 2. FIG. 1 illustrates the structure of the force-applying input device of the first embodiment of the present invention. FIG. 2 is a flow chart of the steps of calculating rotational angular speed information in the force-applying input device of the first embodiment of the present invention.

As shown in FIG. 1, the basic structure of the force-applying input device of the first embodiment is the same as that of the related force-applying input device shown in FIG. 5. It primarily comprises an operation unit 1 operated by an operator, an encoder 2 for detecting the operation state of the operation unit 1, a torque generating unit 3 for applying a force to the operation unit 1, and a controller 4 for controlling a driving operation of the torque generating unit 3 in order to apply a predetermined force corresponding to the operation state of the operation unit 1 to the operation unit 1.

The operation unit 1 is manually operated by the operation, and may be, for example, a rotary knob, a tilting lever, or a joystick, depending upon the purpose of use of the force-applying input device.

The encoder 2 converts the amount and direction of operation of the operation unit 1 to a quantity of electricity, and outputs the quantity of electricity. Ordinarily, any encoder which can output two-phase signal pulses is used.

The torque generating unit 3 applies a predetermined force to the operation unit 1, and may be, for example, a rotary motor, a linear motor, or a solenoid. When a linear motor or a solenoid is used as the torque generating unit 3, a predetermined power transmission device for converting linear motion of the torque generating unit 3 to rotational motion and transmitting the rotational motion to the operation unit 1 is disposed between the torque generating unit 3 and the operation unit 1.

As shown in FIG. 1, the controller 4 comprises a first rotational angular speed calculating unit 4a for calculating rotational angular speed information of the operation unit 1 by signal pulses output from the encoder 2, a torque calculating unit 4b for calculating torque information supplied to the torque generating unit 3, a rotational angular acceleration calculating unit 4c for calculating rotational angular acceleration information of the operation unit 1 by the torque information output from the torque calculating unit 4b, a second rotational angular speed calculating unit 4d for calculating rotational angular speed of the operation unit 1 by the rotational angular acceleration information output from the rotational angular acceleration calculating unit 4c, a rotational angular speed selecting unit 4e for selecting either the rotational angular speed information output from the first rotational angular speed calculating unit 4a or the rotational angular speed information output from the second rotational angular speed calculating unit 4d, and a rotational angle calculating unit 4f for calculating rotational angular information of the operation unit 1 by either the rotational angular speed information output from the first rotational angular speed calculating unit 4a or the rotational angular speed information output from the second rotational angular speed calculating unit 4d. When the rotational angular speed information output from the first rotational angular speed calculating unit 4a exceeds a predetermined value, the rotational angular speed selecting unit 4e selects the rotational angular speed information output from the second rotational angular speed calculating unit 4d, and outputs the selected rotational angular speed information to the torque calculating unit 4b and the rotational angle calculating unit 4f. The torque calculating unit 4b calculates the torque information based on the rotational angular speed information output from the rotational angular speed calculating unit 4a and the rotational angle information output from the rotational angle calculating unit 4f, and outputs the calculated torque information to the torque generating unit 3. A torque component which is calculated based on the rotational angular speed information corresponds to viscous friction torque, and a torque component which is calculated based on the rotational angle information corresponds to the force applied to the operation unit 1 that provides, for example, a tactile feel.

Next, the steps of calculating the rotational angular speed information in the force-applying input device of the first embodiment will be described with reference to FIG. 2.

When the operation unit 1 is operated, the first rotational angular speed calculating unit 4a counts a number n of signal pulses per definite period of time $\Delta t$ output from the encoder 2 (Step S1), and calculates rotational angular speed information $\theta dot1$ of the operation unit 1 using an expression $\theta dot1 = \Delta\theta \cdot n / \Delta t$ (Step S2). $\Delta\theta$ in the expression refers to the resolution of the encoder 2. Then, from inertial moment J of the operation unit 1 and torque information T supplied to the torque generating unit 3 from the torque calculating unit 4b, the rotational angular acceleration calculating unit 4c calculates rotational angular acceleration information $\theta dotdot$ of the operation unit 1 using an expression $\theta dotdot = T/J$ (Step S3). Next, based on the rotational angular acceleration information $\theta dotdot$ determined in Step S3, the second rotational angular. calculating unit 4d calculates rotational angular speed information $\theta dot2$ of the operation unit 1 using an expression $\theta dot2 = \theta dot2Old + \theta dotdot \cdot \Delta t$ (Step S4). $\theta dot2Old$ in the expression indicates the previous $\theta dot2$. Next, the rotational angular speed selecting unit 4e determines whether or not the rotational angular speed information $\theta dot1$ of the operation unit 1 calculated in Step S2 is equal to or greater than a predetermined value (Step S5). If the rotational angular speed information $\theta dot1$ is not equal to or greater than the predetermined value, it is output as rotational angular speed information $\theta dot$ of the operation unit 1 (Step S6). In contrast, if the rotational angular speed information $\theta dot1$ is equal to or greater than the predetermined value, the rotational angular speed information $\theta dot2$ calculated in Step S4 is output (Step S7).

In the force-applying input device of the first embodiment, the controller 4 comprises the first rotational angular speed calculating unit 4a for calculating rotational angular speed information of the operation unit 1 by signal pulses output from the encoder 2, the rotational angular acceleration calculating unit 4c for calculating rotational angular acceleration information of the operation unit 1 by the torque information output from the torque calculating unit 4b, the second rotational angular speed calculating unit 4d for calculating rotational angular speed of the operation unit 1 by the rotational angular acceleration information output from the rotational angular acceleration calculating unit 4c, and the rotational angular speed selecting unit 4e for selecting either the rotational angular speed information output from the first rotational angular speed calculating unit 4a or the rotational angular speed information output from the second rotational angular speed calculating unit 4d. When the rotational angular speed information output from the first rotational angular speed calculating unit 4a exceeds a predetermined value, the rotational angular speed selecting unit 4e selects the rotational angular speed information output from the second rotational angular speed calculating unit 4d, and outputs the selected rotational angular speed information to the torque calculating unit 4b and the rotational angle calculating unit 4f. Therefore, even if the first rotational angular speed calculating unit 4a does not provide precise rotational angular speed information due to a high operation speed of the operation unit 1, a driving operation of the torque generating unit 3 can be controlled based on rotational angular speed information corresponding to the operation speed of the operation unit 1 and which is calculated by the second rotational angular speed calculating unit 4d. Consequently, it is possible to reliably prevent the torque generating unit 3 from getting out of control, and, thus, to enhance the operability and reliability of the force-applying input device.

The force which is calculated based on the rotational angle information output from the rotational angle calculating unit 4f may be applied to the operation unit 1 by the technology previously proposed by the applicant and disclosed in Japanese Unexamined Patent Application Publication No. 2002-149324. An actuator control system, a manual operation unit 3, an actuator 14, and an encoder 25 which are discussed in this publicly known document correspond to the controller 4, the operation unit 1, the torque generating unit 3, and the encoder 2, respectively.

Figure 3:
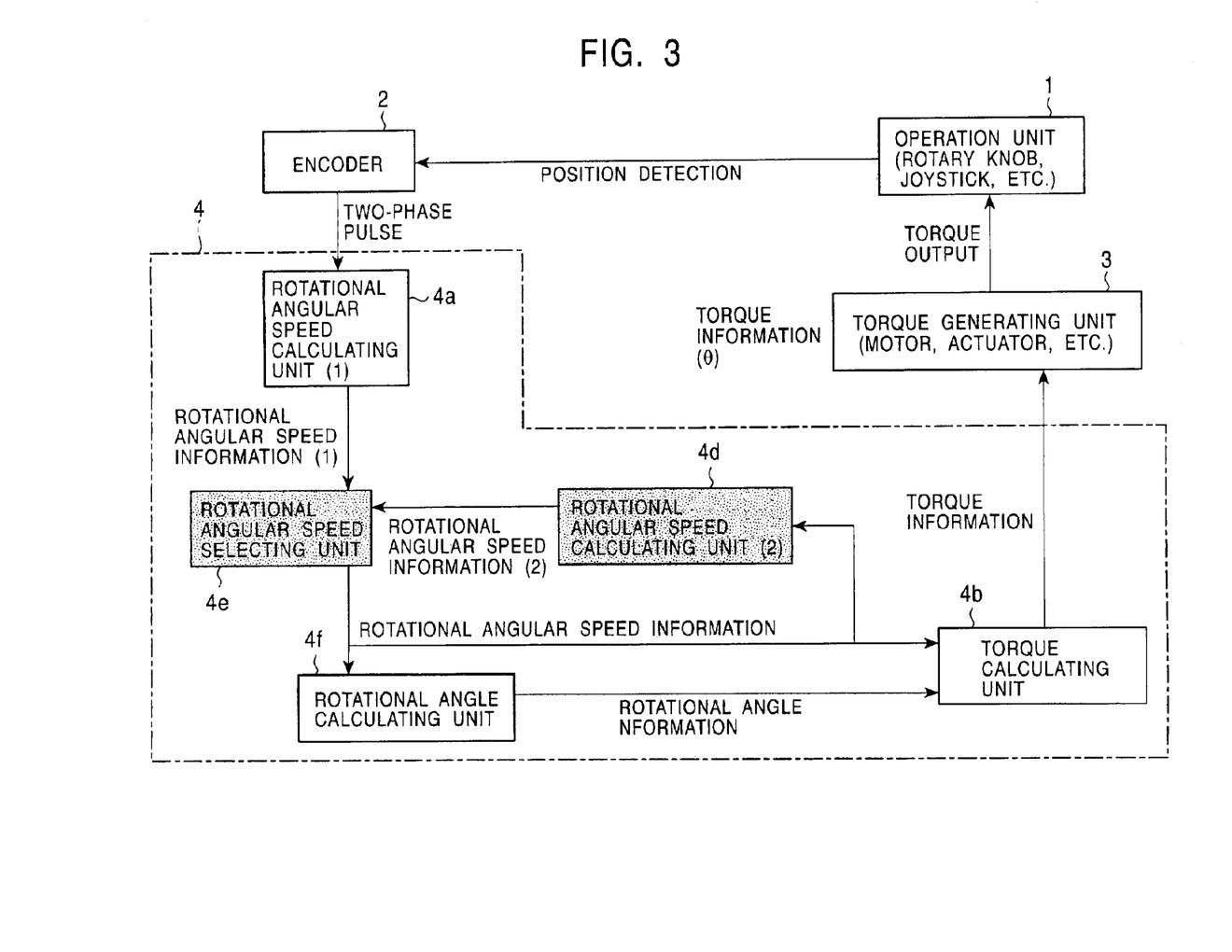
FIG. 3 illustrates the structure of a force-applying input device of a second embodiment of the present invention.
Figure 4:
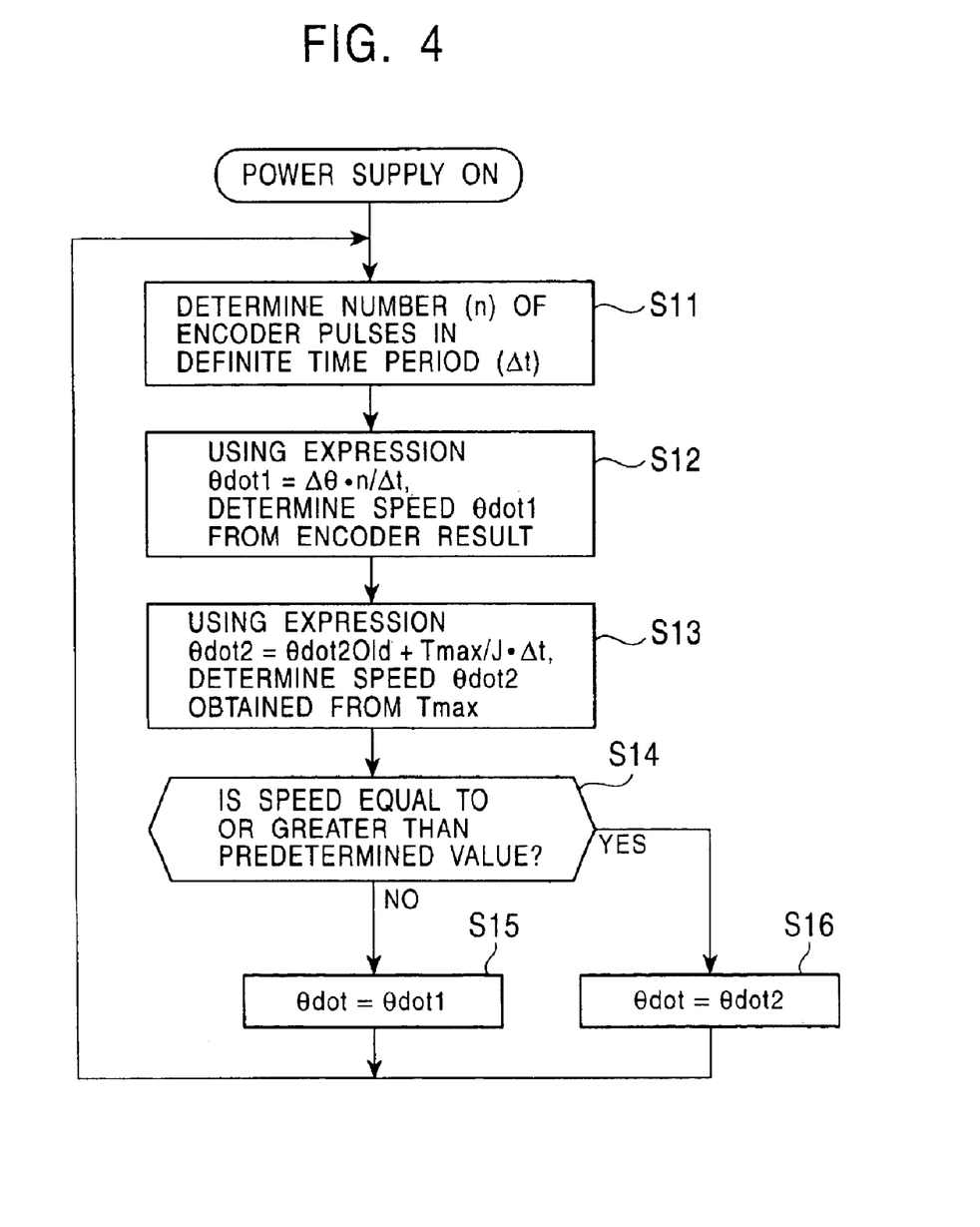
FIG. 4 is a flow chart of the steps of calculating rotational angular speed information in the force-applying input device of the second embodiment of the present invention.

Hereunder, a force-applying input device of a second embodiment of the present invention will be described with reference to FIGS. 3 and 4. FIG. 3 shows the structure of the force-applying input device of the second embodiment of the present invention. FIG. 4 is a flow chart of the steps of calculating rotational angular speed information in the force-applying input device of the second embodiment.

As is clear from FIG. 3, the force-applying input device of the second embodiment does not comprise a rotational angular acceleration calculating unit 4c, and calculates rotational angular speed along with a rotational angular acceleration component of a torque generating unit by a second rotational angular speed calculating unit 4d. The second rotational angular speed calculating unit 4d stores the maximum torque of the torque generating unit 3 and the inertial moment of an operation unit 1. The other structural features of the force-applying input device of the second embodiment are the same as those of the force-applying input device of the first embodiment. Parts corresponding to those of the force-applying input device of the first embodiment will be given the same reference numerals, and will not be described below.

The steps of calculating the rotational angular speed information by the force-applying input device of the second embodiment will be described with reference to FIG. 4.

When the operation unit 1 is operated, the first rotational angular speed calculating unit 4a counts a number n of signal pulses per definite period of time $\Delta t$ output from an encoder 2 (Step S11), and calculates rotational angular speed information $\theta dot1$ of the operation unit 1 using an expression $\theta dot1 = \Delta\theta \cdot n / \Delta t$ (Step S12). Next, based on a previously stored maximum torque Tmax of the torque generating unit 3 and a previously stored inertial moment J of the operation unit 1, the second rotational angular speed calculating unit 4d calculates rotational angular speed information $\theta dot2$ of the operation unit 1 using an expression $\theta dot2 = \theta dot2Old + Tmax/J \cdot \Delta t$ (Step S13). Next, the rotational angular speed selecting unit 4e determines whether or not the rotational angular speed information $\theta dot1$ of the operation unit 1 calculated in Step S12 is equal to or greater than a predetermined value (Step S14). If the rotational angular speed information $\theta dot1$ is not equal to or greater than the predetermined value, it is output as rotational angular speed information $\theta dot$ of the operation unit 1 (Step S15). In contrast, if the rotational angular speed information $\theta dot1$ is equal to or greater than the predetermined value, the rotational angular speed information $\theta dot2$ calculated in Step S13 is output (Step S16).

The torque generating unit 3 gets out of control only when the actual operation speed of the operation unit is greater than the operation speed of the operation unit calculated by the controller 4. Therefore, as in the force-applying input device of the second embodiment, when the rotational angular speed of the operation unit 1 is calculated based on the maximum torque of the torque generating unit 3 and the inertial moment of the operation unit 1 which are stored in the second rotational angular speed calculating unit 4d, and the rotational angular speed selecting unit 4e selects the rotational angular speed information output from the second rotational angular speed calculating unit 4d, the maximum viscous friction torque component can be applied to the torque generating unit 3. Consequently, it is possible to reliably prevent the torque generating unit 3 from getting out of control. In addition, since it becomes unnecessary to calculate rotational angular acceleration by the rotational angular acceleration calculating unit, it is possible to simplify the circuit structure of the controller 4, and to increase the calculation speed.

What is claimed is:

1. A force-applying input device comprising:

an operation unit operated by an operator;

an encoder for detecting an operation state of the operation unit;

a torque generating unit for applying a force to the operation unit; and a controller for controlling a driving operation of the torque generating unit in order to apply a predetermined force corresponding to the operation state of the operation unit to the operation unit, wherein the controller comprises a first rotational angular-speed calculating unit, a second rotational angular speed calculating unit, a rotational angular speed selecting unit, a rotational angle calculating unit, and a torque calculating unit, the first rotational angular speed calculating unit calculates rotational angular speed information of the operation unit based on a signal pulse output from the encoder, the second rotational angular speed calculating unit calculates rotational angular speed information of the operation unit based on rotational angular acceleration which the operation unit undergoes, the rotational angular speed selecting unit selects either the rotational angular speed information output from the first rotational angular speed calculating unit or the rotational angular speed information output from the second rotational angular speed calculating unit, the rotational angular speed information output from the second rotational angular speed calculating unit being selected and being output to the rotational angle calculating unit and the torque calculating unit when the rotational angular speed information output from the first rotational angular speed calculating unit is greater than a predetermined value, the rotational angle calculating unit calculates rotational angle information of the operation unit based on the rotational angular speed information output from the rotational angular speed selecting unit, and the torque calculating unit calculates information of torque to be applied to the torque generating unit, based on the rotational angular speed information output from the rotational angular speed selecting unit and the rotational angle information output from the rotational angle calculating unit.

2. A force-applying input device according to claim 1, wherein the controller further comprises a rotational angular acceleration calculating unit for calculating rotational angular acceleration information of the operation unit based on inertial moment of the operation unit and the torque information to be output to the torque generating unit from the torque calculating unit, and the second rotational angular speed calculating unit calculates the rotational angular speed information of the operation unit based on the rotational angular acceleration information output from the rotational angular acceleration calculating unit.

3. A force-applying input device according to claim 1, wherein the second rotational angular speed calculating unit stores maximum torque of the torque generating unit and inertial moment of the operation unit, and calculates the rotational angular speed information of the operation unit based on the maximum torque and the inertial moment.

* * * * *